(12) United States Patent
Bayoumi et al.

(10) Patent No.: US 11,166,057 B2
(45) Date of Patent: Nov. 2, 2021

(54) SYSTEM FOR HIGH PERFORMANCE ON-DEMAND VIDEO TRANSCODING

(71) Applicant: University of Louisiana at Lafayette, Lafayette, LA (US)

(72) Inventors: Magdy A. Bayoumi, Lafayette, LA (US); Xiangbo Li, Lafayette, LA (US); Mohsen Amini Salehi, Lafayette, LA (US)

(73) Assignee: UNIVERSITY OF LOUISIANA AT LAFAYETTE, Lafayette, LA (US)

( * ) Notice: Subject to any disclaimer, the term of this patent is extended or adjusted under 35 U.S.C. 154(b) by 0 days.

(21) Appl. No.: 16/507,533

(22) Filed: Jul. 10, 2019

(65) Prior Publication Data

US 2019/0335214 A1   Oct. 31, 2019

Related U.S. Application Data

(63) Continuation of application No. 16/135,068, filed on Sep. 19, 2018, now Pat. No. 10,397,621, which is a (Continued)

(51) Int. Cl.
*H04N 21/2343* (2011.01)
*H04N 21/845* (2011.01)
(Continued)

(52) U.S. Cl.
CPC . *H04N 21/234309* (2013.01); *G06F 9/45558* (2013.01); *G06F 9/5027* (2013.01);
(Continued)

(58) Field of Classification Search
CPC .......... H04N 21/8456; H04N 21/2343; H04N 21/47202; H04N 21/2747;
(Continued)

(56) References Cited

U.S. PATENT DOCUMENTS 5,822,024 A * 10/1998 Setogawa ............ G11B 27/031
348/425.1
8,955,027 B1 * 2/2015 Dong ............... H04N 21/23424
725/116

(Continued)

*Primary Examiner* — Hsiungfei Peng
(74) *Attorney, Agent, or Firm* — Jessica C. Engler; Russel O. Primeaux; Kean Miller, LLP

(57) ABSTRACT

Video streams, either in form of on-demand streaming or live streaming, usually have to be transcoded based on the characteristics of clients' devices. Transcoding is a computationally expensive and time-consuming operation; therefore, streaming service providers currently store numerous transcoded versions of the same video to serve different types of client devices. Due to the expense of maintaining and upgrading storage and computing infrastructures, many streaming service providers recently are becoming reliant on cloud services. However, the challenge in utilizing cloud services for video transcoding is how to deploy cloud resources in a cost-efficient manner without any major impact on the quality of video streams. To address this challenge, in this paper, the Cloud-based Video Streaming Service (CVSS) architecture is disclosed to transcode video streams in an on-demand manner. The architecture provides a platform for streaming service providers to utilize cloud resources in a cost-efficient manner and with respect to the Quality of Service (QoS) demands of video streams. In particular, the architecture includes a QoS-aware scheduling method to efficiently map video streams to cloud resources, and a cost-aware dynamic (i.e., elastic) resource provisioning policy that adapts the resource acquisition with respect to the video streaming QoS demands. Simulation results based on realistic cloud traces and with various workload conditions, demonstrate that the CVSS architecture can satisfy video streaming QoS demands and reduces the incurred cost of stream providers up to 70%.

10 Claims, 13 Drawing Sheets

Related U.S. Application Data continuation of application No. 15/809,071, filed on Nov. 10, 2017, now Pat. No. 10,298,969.

(60) Provisional application No. 62/420,172, filed on Nov. 10, 2016.

(51) Int. Cl.
| | | |
|---|---|---|
| *H04N 19/156* | (2014.01) | |
| *H04L 12/24* | (2006.01) | |
| *H04L 29/06* | (2006.01) | |
| *H04L 29/08* | (2006.01) | |
| *G06F 9/50* | (2006.01) | |
| *G06F 9/455* | (2018.01) | |
| *H04N 19/177* | (2014.01) | |
| *H04N 19/40* | (2014.01) | |

(52) U.S. Cl.
CPC ............ *H04L 65/607* (2013.01); *H04L 65/80* (2013.01); *H04L 67/2852* (2013.01); *H04L 67/32* (2013.01); *H04N 19/177* (2014.11); *H04N 21/8456* (2013.01); *H04N 19/40* (2014.11)

(58) Field of Classification Search
CPC ......... H04N 21/23439; H04N 21/2347; H04N 21/26258; H04N 21/234309; H04N 21/6125; H04N 21/23424
See application file for complete search history.

(56) References Cited

U.S. PATENT DOCUMENTS

| | | | |
|---|---|---|---|
| 9,860,612 B2 * | 1/2018 | Good | H04N 21/84 |
| 10,298,969 B2 * | 5/2019 | Bayoumi | H04N 21/234309 |
| 2005/0179567 A1 * | 8/2005 | Apostolopoulos | H04N 21/235 341/50 |
| 2008/0273554 A1 * | 11/2008 | Shao | H04N 21/6375 370/498 |
| 2015/0074201 A1 * | 3/2015 | Maria | H04L 51/10 709/206 |

* cited by examiner

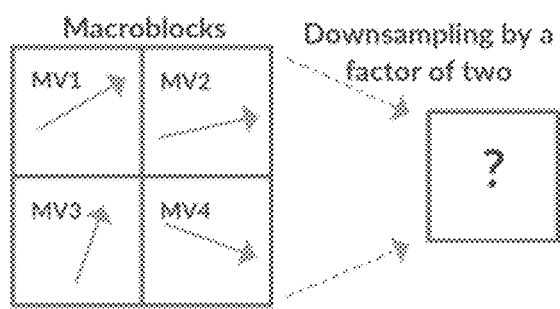 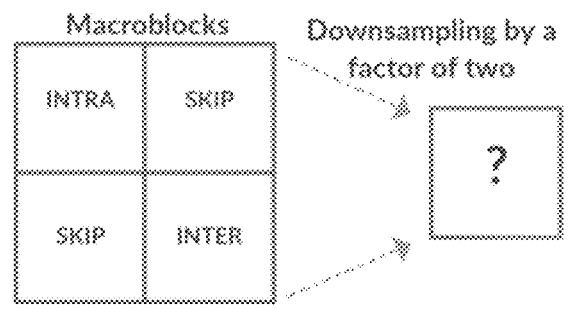
FIG. 2a
MV downscaling
FIG. 2b
MB type downscaling

SYSTEM FOR HIGH PERFORMANCE ON-DEMAND VIDEO TRANSCODING

CROSS REFERENCE TO RELATED APPLICATION

This application is a continuation of U.S. nonprovisional application titled "SYSTEM AND METHOD FOR HIGH PERFORMANCE ON-DEMAND VIDEO TRANSCODING", U.S. Ser. No. 16/135,068, filed on Sep. 19, 2018, which is a continuation of U.S. nonprovisional application titled "ARCHITECTURE AND METHOD FOR HIGH PERFORMANCE ON DEMAND VIDEO TRANSCODING", U.S. Ser. No. 15/809,071 filed on Nov. 10, 2017, which claims benefit to provisional application titled "HIGH PERFORMANCE ON DEMAND VIDEO TRANSCODING USING CLOUD SERVICES", U.S. Patent Application No. 62/420,175, filed on Nov. 10, 2016, which is incorporated herein by reference in its entirety and for all purposes.

STATEMENT REGARDING FEDERALLY SPONSORED RESEARCH

Not applicable.

REFERENCE TO A "SEQUENCE LISTING", A TABLE, OR COMPUTER PROGRAM

Not applicable.

DESCRIPTION OF THE DRAWINGS

The drawings constitute a part of this specification and include exemplary examples of the SYSTEM FOR HIGH PERFORMANCE ON-DEMAND VIDEO TRANSCODING, which may take the form of multiple embodiments. It is to be understood that in some instances, various aspects of the invention may be shown exaggerated or enlarged to facilitate an understanding of the invention. Therefore, drawings may not be to scale.

FIG. 2(a) depicts spatial resolution downscaling using MV type downscaling.

FIG. 2(b) depicts spatial resolution downscaling using MB type downscaling.

FIELD OF THE INVENTION

This invention generally relates to the field of cloud-based video transcoding.

BACKGROUND OF THE INVENTION

The way consumers watch videos has dramatically changed over the past decades. The methods for watching videos has evolved from traditional TV systems, to video streaming on desktops, laptops, and smart phones through Internet. Video streaming currently constitutes approximately 64% of all the U.S. Internet traffic. "Global Internet Phenomena Report", Sandvine Intelligent Broadband Networks (2015). Cisco Systems, Inc. estimates that the streaming traffic will increase up to 80% of the whole Internet traffic by 2019. C.V.N. Index, "Forecast and methodology, 2014-2019" (2015).

Figure 1:
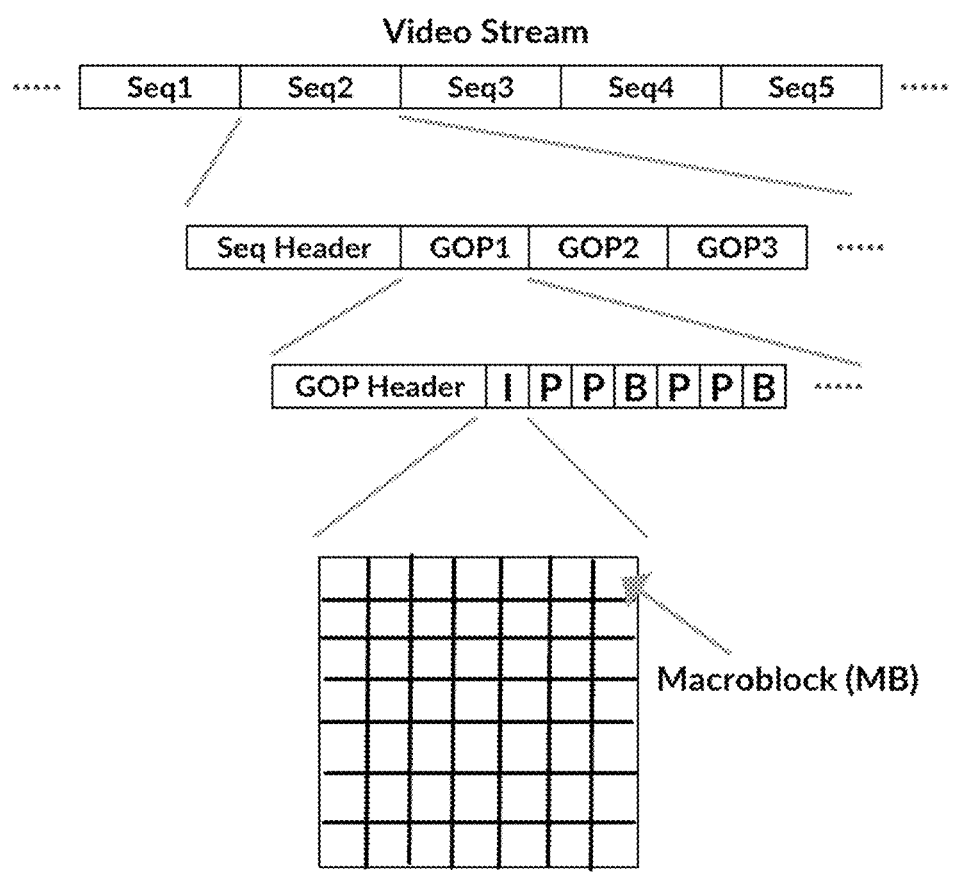
FIG. 1 depicts the structure of a video stream that consists of several sequences. Each sequence includes several Groups of Pictures (GOPs). Each frame of GOPs contains several macroblocks.

A video stream, which is shown in FIG. 1, consists of several sequences. Each sequence is divided into multiple Group of Pictures ("GOP"), with the sequence header information at the front. A GOP is essentially a sequence of frames beginning with I (intra) frame, followed by a number of P (predicted) frames or B (be-directional predicted) frames. There are two types of GOP: open-GOP and closed-GOP. In close-GOP, there is no inter-relation among GOPs, hence, can be transcoded independently. In contrast, there is an inter-dependency between GOPs in open-GOP. Each frame of the GOP contains several slices that consist of a number of microblocks (MB) which is the basic operation unit for video encoding and decoding.

Video content, either in form of on-demand streaming (e.g., YouTube or Netflix) or live-streaming (e.g., Livestream), needs to be converted based on the characteristics of the client's devices. Video contents are initially captured with a particular format, spatial resolution, frame rate, and bit rate. Then the video is uploaded to streaming servers. Streaming servers usually adjust the original video based on the client's network bandwidth, device resolution, frame rate, and video codec. All these conversions and adjustments are generally referred to as video transcoding. I. Ahmad, X. Wei, Y. Sun, and Y. Q. Zhang, "Video transcoding: an overview of various techniques and research issues," *IEEE on Signal Processing Magazine*, vol. 20, no. 2, pp. 18-29 (2003). The conversion is termed "video transcoding."

In video transcoding, video streams can be split at different levels, namely sequence level, GOP level, frame level, slice level, and macroblock level. Sequence level contains several GOPs that can be transcoded independently. Video transcoding is a computationally heavy and time-consuming process. Due to the large size of each sequence, its transmissions and transcoding time is long. On the other hand, frames, slices, and macroblocks have temporal and spatial dependency, which makes their processing complicated and slow. F. Lao, X. Zhang, and Z. Guo, "Parallelizing video transcoding using map-reduce-based cloud computing", *Proceedings of IEEE International Symposium on Circuits and Systems*, pp. 2905-08 (2012). In order to avoid unnecessary communication delay between the different cloud servers (i.e., virtual machine), video streams are commonly split into GOPs that can be transcoded independently. F. Jokhio, T. Deneke, S. Lafond, and J. Lilus, "Analysis of video segmentation for spatial resolution reduction video transcoding," *Proceedings of IEEE International Symposium on Intelligent Signal Processing and Communications Systems (ISPACS)*, pp. 1-6 (2011).

Bit rate adjustment is one kind of commonly performed transcoding operation. To produce high quality video contents, it has to be encoded with a high bit rate. However, high bit rate also means the video content needs large network bandwidth for transmission. Considering the diverse network environment of various clients, streaming service providers typically transcode the video stream's bit rate to ensure smooth streaming. O. Werner, "Requantization for transcoding of mpeg-2 intraframes", *IEEE Transactions on Image Processing*, vol. 8, pp. 179-191 (1999).

Spatial Resolution Reduction is another commonly performed transcoding operation. Spatial resolution indicates the encoded dimensional size of a video. The dimensional size does not necessarily match to the screen size of the client's devices. To avoid losing content, macroblocks of an original video have to be removed or combined (i.e., downscaled) to produce lower spatial resolution video. There are several circumstances where the spatial resolution algorithms can be applied to reduce the spatial resolution without sacrificing quality. FIG. 2(a) shows the challenge in mapping four motion vectors (MV) to one. J. Xin, M. T. Sun, K. Chun, and B. S. Choi, "Motion re-estimation for hdtv to sdtv transcoding," *Proceedings of IEEE International Sympo-sium on Circuits and Systems (ISCAS)*, vol. 4, pp. 179-191 (1999). FIG. 2(b) shows the challenge in determining the type from several types. N. Bjork and C. Christopoulos, "Transcoder architectures for video coding," *IEEE Transactions on Consumer Electronics*, vol. 44, no. 1, pp. 88-98 (1998).

Temporal Resolution Reduction is another commonly performed transcoding operation. This operation occurs when the client's device only supports lower frame rate, and the stream server has to drop some frames. However, due to the dependency between frames, dropping frames may cause MVs to become invalid for the incoming frames. Temporal resolution reduction can be achieved using methods currently known in the art. See, e.g., S. Goel, Y. Ismail, and M. Bayoumi, "High-speed motion estimation architecture for real-time video transmission," *The Computer Journal*, vol. 55, no. 1, pp. 35-46 (2012); Y. Ismail, J. B. McNeely, M. Shaaban, H. Mahmoud, M. Bayoumi et al, "Fast motion estimation system using dynamic models for h.264/avc video coding," *IEEE Transactions on Circuits and Systems for Video Technology*, vol. 22, no. 1, pp. 28-42 (2012).

Video Compression Standard Conversion is another commonly performed transcoding operation. Video compression standards vary from MPEG2 to H.264, and to the most recent one, HEVC. Video contents are encoded by various video compression standards. Therefore, video streams usually need to be transcoded to the supported codec on client devices. M. Shaaban and M. Bayoumi, "A low complexity inter mode decision for mpeg-2 to h.264/avc video transcoding in mobile environments," *Proceedings of the 11th IEEE International Symposium on Multimedia (ISM)*, pp. 385-391 (2009); T. Shanableh, E. Peixoto, and E. Izquierdo, "Mpeg-2 to hevc video transcoding with content-based modeling," *IEEE Transactions on Circuits and Systems for Video Technology*, vol. 23, pp. 1191-1196 (2013).

Due to the limitations in processing power and energy sources (e.g., in smart phones), it is not practical to transcode videos on clients' devices. X. Li, M. A. Salehi, and M. Bayoumi, "Cloud-based video streaming for energy- and compute-limited thin clients", *Stream2015 Workshop*, Indiana University (2015).

One approach to address the video transcoding problem is to store numerous transcoded versions of the same video to serve different types of client devices. However, this approach requires massive storage resources in addition to powerful processors. Provisioning and upgrading these infrastructures to meet the fast-growing demands of video transcoding is cost-prohibitive, specifically for small- and medium-size streaming service providers. Moreover, given the explosive growth of video streaming demands on a large diversity of the client devices, this approach remains unachievable.

The challenge in utilizing cloud resources for on-demand video transcoding, however, is how to employ them in a cost-efficient manner and without a major impact on the quality of service (QoS) demands of video streams. Video stream clients have unique QoS demands. In particular, they need to receive video streams without any delay. Such delay may occur either during streaming, due to an incomplete transcoding task by its presentation time ("missing presentation deadline"), or it may occur at the beginning of a video stream ("startup delay"). Previous studies confirm that streaming clients mostly do not watch videos to the end. See X. Cheng, J. Liu, and C. Dale, "Understanding the characteristics of internet short video sharing: a YouTube-based measurement study," *IEEE Transactions on Multimedia*, vol. 15, no. 5, pp. 1184-1194 (2013). However, they rank the quality of a stream provider based on the video's startup delay. Therefore, to maximize clients' satisfaction, we consider video streaming QoS demand as: minimizing the startup delay without missing the presentation deadline.

Streaming service provider's goal is to spend the minimum for cloud resources, while meets the QoS requirements of video streams. Satisfying this goal becomes further complicated when we consider the variations exist in the demand rate of video streams. Thus, to minimize the cost of utilizing cloud resources, our system should adapt its service rate (i.e., transcoding rate) based on the clients' demand rate and with respect to the video streams' QoS requirements. As such, there is a need in the market for: (1) improvement of clients' QoS satisfaction by minimizing video streams startup delay and presentation deadline miss rate; and (2) creation of a dynamic cloud resource provisioning policy to minimize streaming service providers' incurred cost while the clients' QoS demands are respected. To meet these needs, herein disclosed is a Cloud-based Video Streaming Service architecture.

SUMMARY OF THE INVENTION

Described herein is the system for Cloud-based Video Streaming Service (CVSS) architecture for on-demand transcoding of video streams using cloud resources. The architecture includes a scheduling method that is aware of QoS demands of video streams. It also includes a cost-aware dynamic provisioning policy to allocate cloud resources. The goal of this work is to decrease the deadline miss rate and startup delay of video streams and minimize the incurred cost of cloud resources. Experiment results show that the proposed scheduling method provides low QoS violation rate, specifically when combined with SDF queuing policy. Additionally, the dynamic resource provisioning policy helps streaming providers to significantly reduce the cost of using cloud services. In particular, when the video demand rate is not high, it reduces the costs up to 70% in compare with the static policies. The system of CVSS architecture can be particularly useful for small- or medium-size video streaming provides to utilize cloud services as their infrastructure, and improve their clients' satisfaction with low cost.

This system makes several key contributions to the market. First, the system of CVSS architecture enables streaming service providers to use cloud services with minimum cost and maximum user satisfaction. Second, the CVSS architecture system utilizes a QoS-aware scheduling method to map transcoding tasks on cloud resources with minimized deadline miss rate and start up delays. Third, a dynamic resource provisioning policy is disclosed that minimizes the incurred cost to the streaming service providers without any major impact on the video streams' QoS. Fourth, the disclosure analyzes the behavior of the scheduling methods and dynamic resource provisioning policy from different perspectives and under various workloads. Fifth, the disclosure discusses the trade-off involved in configuring the dynamic resource provisioning policy.

DETAILED DESCRIPTION

Figure 3:
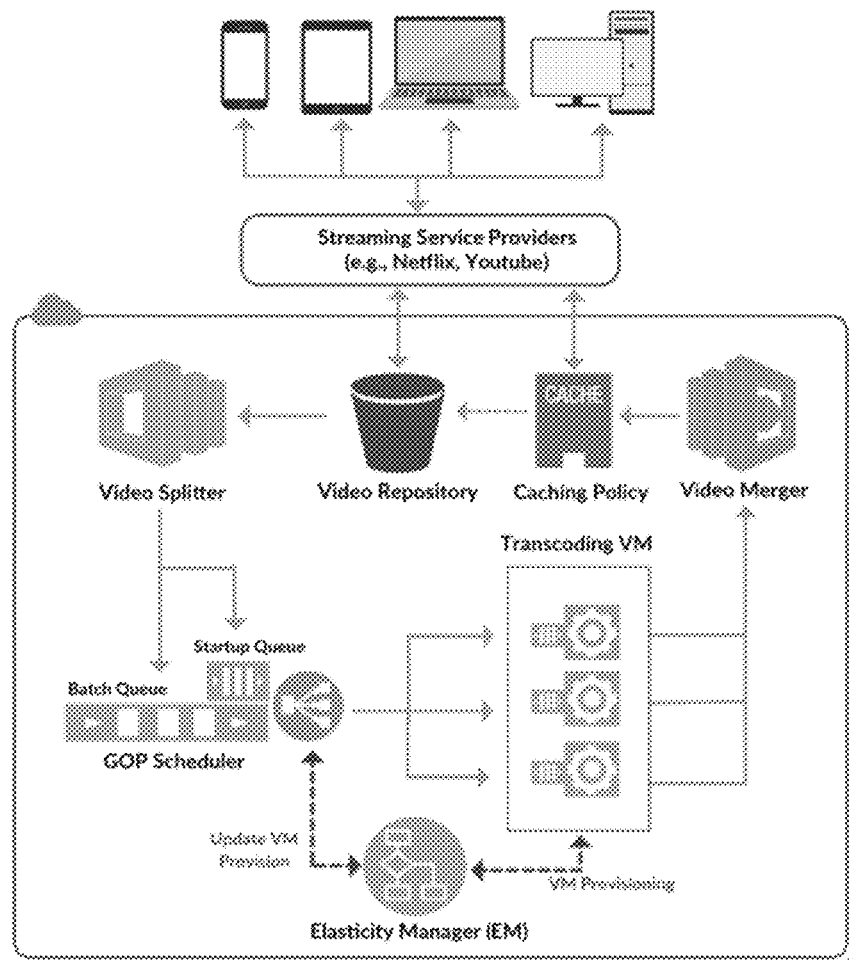
FIG. 3 depicts an overview of an embodiment of the Cloud-based Video Streaming Service (CVSS) Architecture.

An overview of the system of CVSS architecture for on-demand video transcoding in the cloud is shown in FIG. 3. The system shows the sequence of actions taken place when clients request videos from a streaming service provider. The disclosed system includes six main components, namely: video splitter, task (i.e., GOP) scheduler, transcoding virtual machines (VM), elasticity manager, video merger, and caching policy. The cooperation of these components leads to cost-efficient and QoS-aware on-demand video transcoding on the cloud.

In the video splitter component, each video stream is split into several GOPs that can be transcoded independently. Others have considered several GOPs to construct a transcoding segment. In this case, each transcoding task has to deal with several GOPs. In the preferred embodiment, segments are transcoded with one GOP for more efficient scheduling. As such, in the preferred embodiment, each GOP is treated as a task with an individual deadline. The deadline of a GOP is the presentation time of the first frame in that particular GOP. For video on-demand streaming (e.g., Netflix and YouTube), if a GOP misses its deadline, it still has to complete its transcoding. This disclosure considers the close-GOP type where processing of each GOP can be carried out independently.

The transcoding task scheduler ("transcoding scheduler" or "scheduler") is responsible for mapping GOPs to transcoding servers. The scheduler's goal is to satisfy the QoS demands of clients in terms of minimum startup delay and minimum deadline miss rate of video streams. The GOPs of different video streams are interleaved in the scheduling queue. In addition, the scheduler has no assumption or prior knowledge about the arrival pattern of the GOPs to the system.

The transcoding virtual machine(s) (VM(s)) are allocated from the cloud provider to process GOP tasks. In this work, we assume that the allocated VMs are homogeneous. Each VM has a local queue where the required data for GOPs are preloaded before execution. The scheduler maps GOPs to VMs until the local queue gets full. As all allocated VMs that execute transcoding tasks are homogeneous, size of their local queues is the same across all the allocated VMs. Whenever a free spot appears in the local queue of a VM, the scheduler is notified to map a GOP to the VM. We assume that the GOP tasks in the local queue are scheduled in the FCFS fashion.

The elasticity manager (EM) is responsible for monitoring the operation of transcoding VMs in the CVSS architecture, and accordingly resizes the VM cluster with the goal of meeting the clients QoS demands and minimizing the incurred cost to the stream provider. For that purpose, EM includes dynamic (i.e., elastic) resource provisioning policies that are in charge of allocating and deallocating VM(s) from the cloud provider based on the clients' demand rate. When video streams' QoS violation rate increases or the scheduling queues size increases, the EM allocates VM(s) and adds them to the VM cluster. Similarly, resource provisioning policies of EM identifies circumstances that VMs are under-utilized and removes them from the VM cluster to minimize the incurred cost to the streaming service provider. EM is executed periodically and also in an event-based fashion to verify if the allocated VMs are sufficient to meet the QoS demands or not. Once the EM updates the set of allocated VMs, it informs the scheduler about the latest configuration of the VM cluster.

The task of video merger is to place all the transcoded GOPs in the right order to create the resulting (i.e., transcoded) video stream. Video merger sends the transcoded streams back to the video repository to be accessed by clients.

The access rate to video streams follows long tail distribution. That is, there are few videos that are accessed very frequently (i.e., trending videos), and many others that are barely streamed by clients. Therefore, to avoid unnecessary transcoding of the trending videos, the CVSS architecture provides a caching policy to decide whether a transcoded video should be cached or not. However, if the video is barely requested by clients, there is no need to store (i.e., cache) the transcoded version of that. Such videos are transcoded in an on-demand manner upon clients' request.

Figure 4:
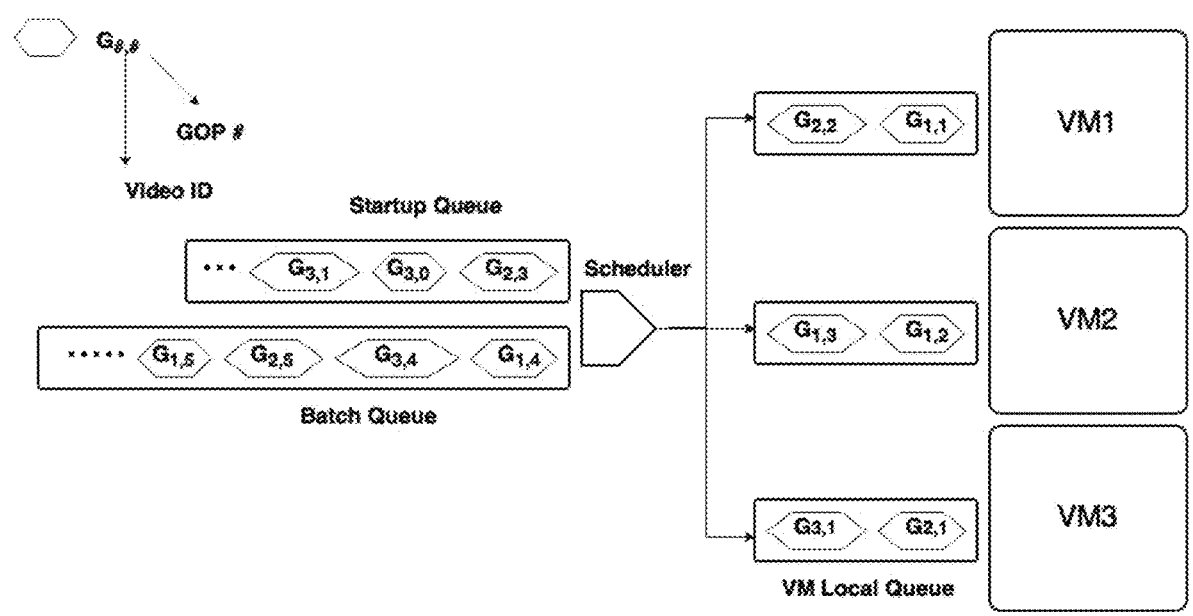
FIG. 4 depicts an embodiment of Quality of Service (QoS)-aware Scheduling Architecture.

QoS-Aware Transcoding Scheduling Method: The transcoder scheduler architecture is shown in FIG. 4. For scheduling, GOPs of the requested video streams are batched in a queue upon arrival. To minimize the startup delay of video streams, another queue is termed the startup queue. The first few GOPs of each new video stream are placed in the startup queue that has a higher priority in comparison to the batch queue. To avoid any execution delay, each VM is allocated a local queue where required data for GOPs are preloaded, before the GOP transcoding execution started.

For each GOP j from video stream i, denoted $G_{ij}$, the arrival time and the deadline (denoted $\delta_{ij}$) are available. The GOP deadline is relative to the beginning of the video stream. Therefore, to obtain the absolute deadline for $G_{ij}$ (denoted $\Delta_{ij}$) the relative deadline must be added to the presentation start time of the video stream (denoted $\psi_i$). That is, $\Delta_{ij}=\delta_{ij}+\psi_i$.

In on-demand video streaming, a video usually has been streamed multiple times by different clients. Therefore, an estimation of the transcoding execution time for each $G_{ij}$ (briefly called transcoding time and denoted $\tau_{ij}$), can be obtained from the historic execution information of $G_{ij}$. We note that, although we transcode the same GOP of a given video on a cluster of homogeneous VMs, there is some randomness (i.e., uncertainty) in the transcoding execution time. That is, the homogeneous VMs do not necessarily provide identical performance. This is attributed to the fact that the VMs can be potentially allocated on different (i.e., heterogeneous) physical machines on the cloud. The performance variation of a VM can also be attributed to other neighboring VMs that coexist with the VM on the same physical host in the cloud datacenter. For instance, if the neighboring VMs have a lot of memory access, then, there will be a contention to access the memory and the performance of the VM will be different with situation that there is not such neighboring VM.

To capture the randomness in the estimated execution time of GOPs, we consider $\tau_{ij}$ as the worst-case analysis of transcoding time estimation. That is, in the scheduling, we consider $\tau_{ij}$ as the sum of mean historic execution times of $G_{ij}$ plus its standard deviation.

Once a free spot appears in a VM local queue, the scheduler is executed to map a GOP to the free spot. The scheduler maps GOPs to the VM that provides the shortest completion time.

In general, to estimate the completion time of an arriving GOP $G_x$ on $VM_j$, we add up the estimated remaining execution time of the currently executing GOP in $VM_j$ with the estimated execution time of all tasks ahead of $G_x$ in the local queue of $VM_j$. Finally, we add the estimated execution time of $G_x$ (i.e., $\tau_x$). Let $t_r$ the remaining estimated execution time of the currently executing task on $VM_j$, and let $t_c$ is the current time. Then, we can estimate the task completion time for $G_x$ (denoted $\phi_x$) as follows:

$$\phi_x = t_c + t_r + \Sigma_{p=1}^n \tau_p + \tau_x$$

where $\tau_p$ denotes the estimated execution time of any task waiting ahead of $G_x$ in local queue of $VM_j$ and n is the number of waiting tasks in local queue of $VM_j$.

In the proposed scheduling method, a higher priority is assigned to the GOP tasks in the startup queue. However, the priority should not cause missing the deadlines of tasks waiting in the batch queue. Let $G_b$, the first GOP in the batch queue and $G_s$, the first GOP in the startup queue. At each scheduling event, $G_s$ can be scheduled before $G_b$ only if it does not cause $G_b$ to miss its deadline. For that purpose, we calculate the minimum completion time of $G_s$ across all VMs. Then, we can calculate the minimum completion time of $G_b$, assuming that $G_s$ has already been mapped to a VM, and finally check if $G_b$ will miss its deadline or not. If not, then $G_s$ can be scheduled before $G_b$.

The performance of the proposed scheduling method also depends on the queuing policy of the batch queue. We can utilize any conventional queuing policy (e.g., FCFS or SJF) to determine the ordering of tasks in the batch queue.

Dynamic Resource Provisioning Policy Overview: EM in the CVSS architecture is in charge of adapting cloud resource acquisition based on the clients demand rate. For that purpose, EM includes resource provisioning policies that dynamically allocates or deallocates VMs from the cloud provider. Then, the policies notify the transcoding scheduler to consider the changes in its task mapping decisions. The goal of the provisioning policies is to minimize the incurred cost to the stream provider while respecting the video streaming QoS demands. More specifically, the stream provider can determine an upper bound threshold (denoted $\beta$) for the percentage of transcoding tasks that can miss their deadlines (termed deadline miss rate and denoted $\gamma_t$ in a given time t). Similarly, there is a lower bound threshold (denoted $\alpha$) that enables the provisioning policies to reduce the incurred cost of stream providers through terminating VM(s). Therefore, any provisioning policy has to manage VM allocation so that the deadline miss rate remains between $\alpha$ and $\beta$. That is, at any given time t we should have $\alpha \leq \gamma_t \leq \beta$.

Resource provisioning policies of the EM follow the "scale up early and scale down slowly" principle. That is, VM(s) are allocated from cloud as soon as a provisioning decision is made. However, as the stream provider has already paid for the current charging cycle of the allocated VMs, the deallocation decisions are not practiced until the end of the current charging cycle.

Periodic Resource Provisioning Policy: This resource provisioning policy occurs periodically (referred to as "provisioning events") to make allocation or deallocation decisions. At each provisioning event, the policy predicts the deadline miss rate that will occur at the next provisioning event (i.e., $\gamma_{t+1}$) based on the current states of the local queues and the batch queue.

The following Algorithm 1 provides a pseudo-code for the periodic provisioning policy.

---

Algorithm 1
Periodic Resource Provisioning Policy

Input:
    $\alpha$: lower threshold
    $\beta$: upper threshold
    $\gamma_t$: provisioning event
    k: an coefficient based on the arrival rate
Output:
    n: number of VMs to be allocated.
    1:    Calculate current deadline miss rate ($\gamma_t$)
    2:    while Expected task completion time $\leq \gamma_{t+1}$ do
    3:        Hypothetically map a task from startup or batch queue
    4:        Update the task completion time
    5:    end while -continued Algorithm 1
Periodic Resource Provisioning Policy 6: Estimate next provisioning event deadline miss rate ($\gamma_{t+1}$)
7: Calculate deadline miss rate variation (v = $\gamma_{t+1} - \gamma_t$)
8: if v ≥ 0 and $\gamma_{t+1}$ ≥ β then
9:     Allocate n VMs, where $n = \left\lfloor \frac{k \cdot \gamma_{t+1}}{\beta} \right\rfloor$
10: else if v ≤ 0 and $\gamma_{t+1}$ ≤ α then
11:     Deallocate the VM with the minimum remaining time
12: else
13:     No allocation or deallocation action
14: end if The policy makes allocation decisions based on the current deadline miss rate ($\gamma_t$ in step 1 of the Algorithm 1) and the predicted (i.e., estimated) deadline miss rate in the next provisioning event ($\gamma_{t+1}$ in steps 2 to 6). To predict $\gamma_{t+1}$, the policy assumes that there is no limit on the VMs' local queue sizes. Then, it obtains the expected completion time for each task waiting in the batch or startup queue based on Equation 1 and the scheduling method (see Section IV). Once the tasks completion times are calculated, the provisioning policy can determine the deadline miss rate at the next provisioning event ($\gamma_{t+1}$).

Decision making on allocating new VMs does not only depend on the predicted deadline miss rate in the next provisioning event ($\gamma_{t+1}$), but it also depends on the variation of deadline miss rate until the next event. That is, if the predicted deadline miss rate is beyond the upper bound threshold ($\gamma_{t+1}$>β) but it is less that the current deadline miss rate (i.e., $\gamma_{t+1}-\gamma_t$<0), then it means that the current allocation is effective and the deadline miss rate is reducing (see step 8). Similar phenomenon can happen for deallocating VMs. Having a predicted deadline miss rate less than α is not sufficient to deallocate VMs. In fact, if $\gamma_{t+1}$>α but the deadline miss rate is predicted to increase (i.e., $\gamma_{t+1}-\gamma_t$>0), then we should not deallocate any VM (see step 10).

The number of VM allocations by the policy depends on how far $\gamma_{t+1}$ is from β. That is, the further the predicted deadline miss rate is from β, more VMs have to be allocated (step 9). Arrival rate of transcoding tasks also impacts the deadline miss rate in the system. Therefore, the periodic resource provisioning policy considers the arrival rate (k in step 9) when decides about allocating new VMs. In the case that the predicted deadline miss rate is between the allowed thresholds (α≤$\gamma_t$≤β), the policy does not to take any action in terms of allocating or deallocating VMs (step 13).

Remedial Resource Provisioning Policy: The periodic dynamic provision policy introduced in the previous section predicts deadline miss rates accurately. However, in our initial experiments we noticed that obtaining estimated completion time for all tasks is a time consuming process and imposes a significant overhead at each provisioning event. Hence, it is not efficient to perform provisioning events frequently. In addition, the uncertainty exists in the execution time of each transcoding task is compounded as the length of the VM local queues increases. Thus, the accuracy of predictions on task completion times and deadline miss rates decreases. The last but not the least is the fact that we have no assumption or knowledge about the demand rate that will arrive to the system.

To cope with the inherent problems of the periodic provisioning policy, we propose a lightweight remedial resource provisioning policy that can improve the efficiency of the EM. By injecting this policy to the intervals of the periodic provisioning policy, we can perform the periodic policy less frequently. The remedial provisioning policy provides a quick prediction of the system based on the state of the startup queue.

The tasks in the startup queue have a higher precedence over those in the batch queue. However, such tasks cannot be executed if they cause a deadline miss for the tasks in the batch queue. Thus, when there is a congestion in the startup queue, the tasks deadlines in the batch queue are urgent (i.e., have fast approaching deadlines). Therefore, there is a correlation between the number of tasks waiting in the startup queue and the deadline miss rate in the near future. To avoid such deadline miss rate, our lightweight remedial policy checks the size of the startup queue (denoted Ns). Then, it uses the following equation to decide the number of VMs that should be allocated:

$$n = \left\lfloor \frac{(N_s - 1)}{\theta \cdot \beta} \right\rfloor$$

where n is the number VM(s) that should be allocated. $N_s-1$ is the number of waiting tasks excluding the new arrived one. θ is a constant factor that determines the aggressiveness of the VM allocation in the remedial policy. That is, lower values of θ leads to allocating more VMs and vice versa. In the implementation, we considered θ=10.

Experiment results indicate that the remedial provisioning policy does not incur any extra cost to the stream service provider. Nonetheless, it increases the efficacy of the dynamic provisioning policy by reducing the deadline miss rate and startup delay.

Performance Evaluation: Testing the performance of the disclosed method revealed multiple benefits of the CVSS architecture.

Impact of the QoS-aware Scheduling Method: FIG. 5 demonstrates how the average startup delay of video streams varies when our proposed QoS-aware scheduling method is applied in compare with the situation that the scheduling method is not QoS-aware. To show the impact of different workload intensities, the experiment was performed with various number of video stream requests arriving during the same time interval (horizontal axis in FIG. 5). To focus merely on the impact of the scheduling method, in this experiment, static resource provisioning policy with 10 VMs is considered. Also, Shortest Job First (SJF) is used for the queuing policy in the batch queue.

Figure 5A:
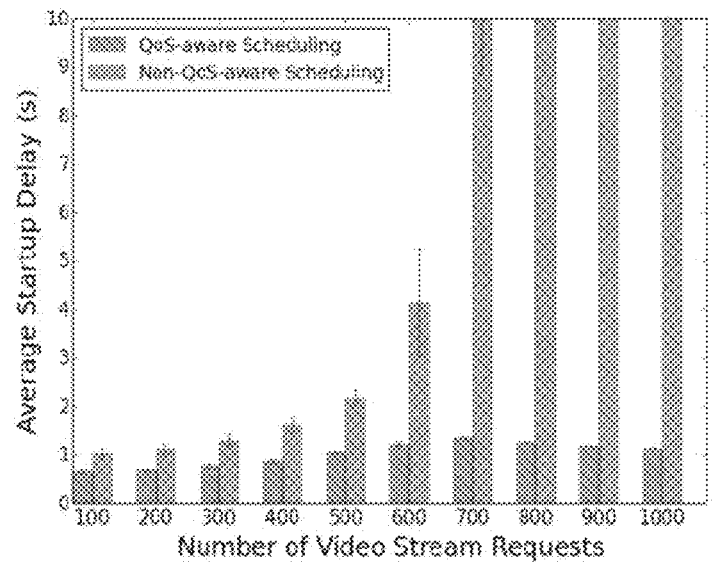
FIG. 5(a) shows a comparison of the average startup delay when using QoS-aware scheduling method versus a non-QoS-aware scheduling.
Figure 5B:
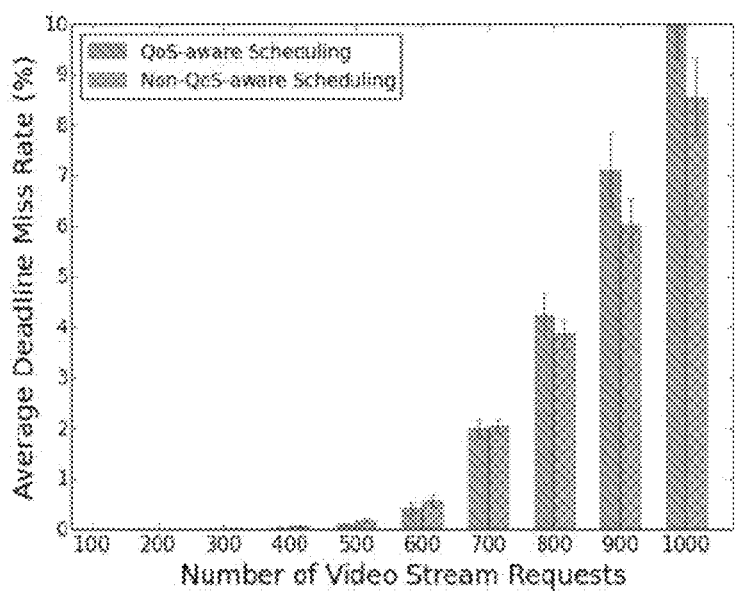
FIG. 5(b) shows a comparison of the deadline miss rate when using QoS-aware scheduling method versus a non-QoS-aware scheduling.
Figure 5C:
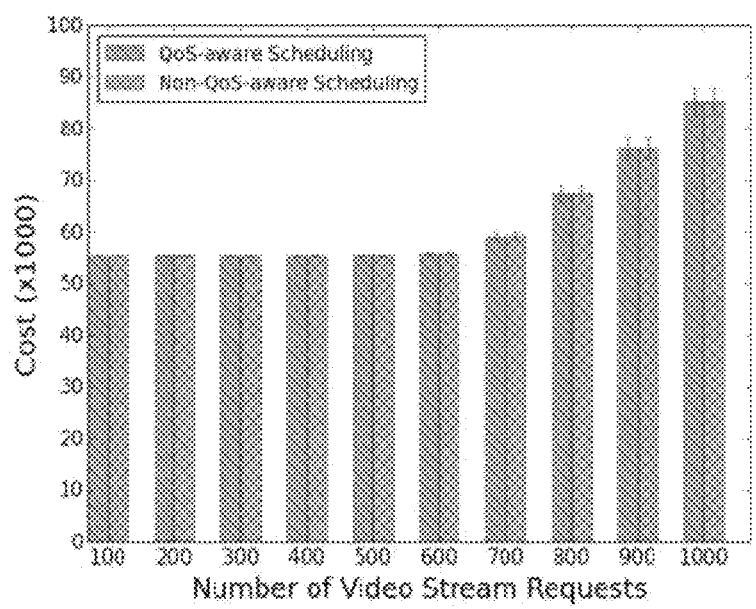
FIG. 5(c) shows a comparison of the cost of using cloud resources when using QoS-aware scheduling method versus a non-QoS-aware scheduling.

FIG. 5(a) shows that, when using QoS-aware scheduling, the average startup delay can be kept to less than 1 second. The startup delay remains almost the same as the number of video streams increases. More importantly, the reduced startup delay is obtained without a major impact on the video streams' deadline miss rate. FIG. 5(b) shows that the average deadline miss rate is almost always less than 10%. This experiment demonstrates that it is possible to transcode videos in an on-demand manner. FIG. 5(c) shows that both with and without QoS-aware scheduling, the incurred cost is almost the same. The reason is that in both methods all tasks have to be completed. Thus, the total time cloud VMs are utilized is the same. The users' QoS satisfaction can thus be improved without incurring extra cost to the stream provider.

Impact of the Queuing Policy: The queuing policy applied on the batch queue, impacts the startup delay, deadline miss rate, and the incurred cost. To obtain the best queuing policy that can work with the QoS-aware scheduling method, three different policies were evaluated, namely first come first serve (FCFS), shortest job first (SJF) and shortest deadline first (SDF).

To differentiate the impact of these queuing policies on the static and dynamic resource provisioning policies, the queuing policies were run on both scenarios separately and their QoS violations and their costs were then compared. 10 VMs were utilized in running the experiments with the static provisioning policy. The result of this experiment is shown in FIGS. 6(a)-6(f).

Figure 6A:
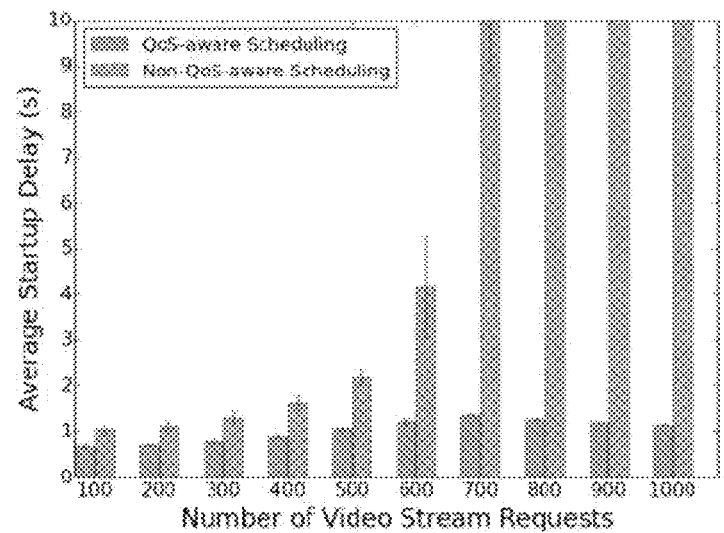
FIG. 6(a) shows a comparison of the average startup delay when using QoS-aware scheduling method versus a non-QoS-aware scheduling when combined with static provisioning policies.
Figure 6B:
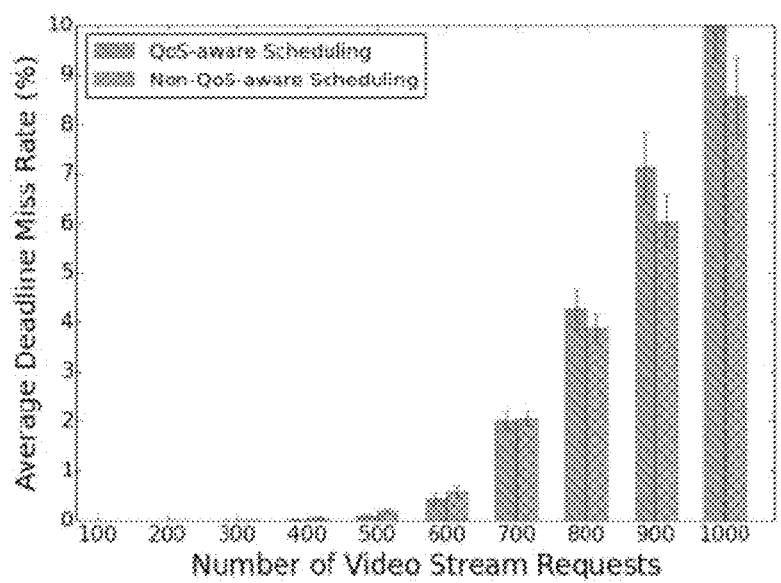
FIG. 6(b) shows a comparison of the average deadline miss rate of different queuing policies on the QoS-aware scheduling method when combined with static provisioning policies.
Figure 6C:
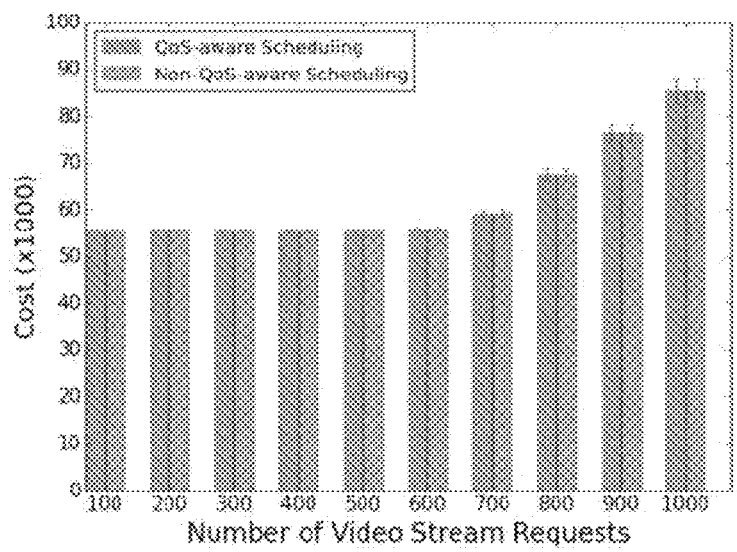
FIG. 6(c) shows a comparison of the incurred cost when using QoS-aware scheduling method versus a non-QoS-aware scheduling when combined with static provisioning policies.

FIGS. 6(a), 6(b), and 6(c) show the performance of the queuing policies when combined with the static resource provisioning policy. As the number of video requests increases, the startup delay and deadline miss rate grow significantly in SDF and FCFS, while remains low and stable with SJF. This is mainly because when there are a massive number of videos being transcoded, the batch queue is congested, and GOPs miss their deadlines. The growth of the deadline miss rate prevents the QoS-based scheduling method to be effective, thus, the startup delay increases too. However, the SJF priorities GOPs with shorter execution times, which significantly reduces congestion. Hence, SJF produces a better startup delay and lower deadline miss rate when combined with the static provisioning policy.

FIG. 6(c) shows that all three queuing policies cost almost the same. In fact, the total transcoding time of all the videos is the same and stream provider has to pay almost the same amount for any static method with a fixed number of VMs.

Figure 6D:
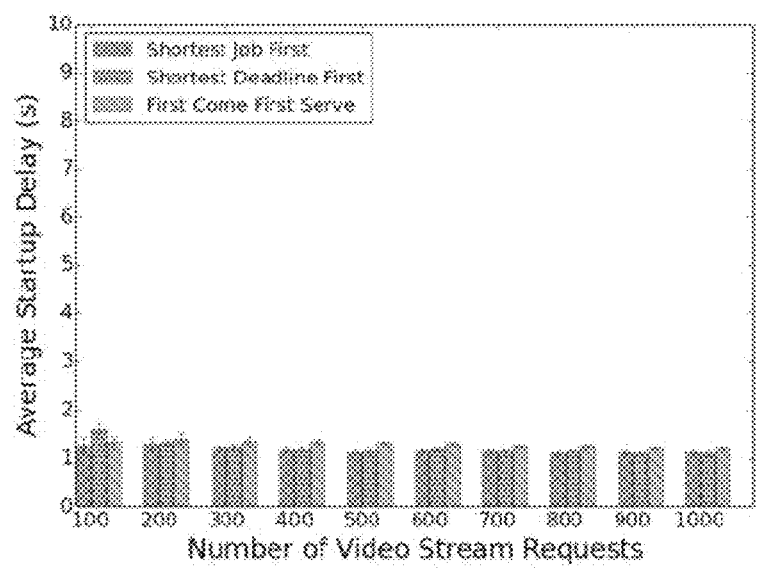
FIG. 6(d) shows a comparison of the average startup delay of different queuing policies, when using QoS-aware scheduling method versus a non-QoS-aware scheduling, when combined with dynamic provisioning policies.
Figure 6E:
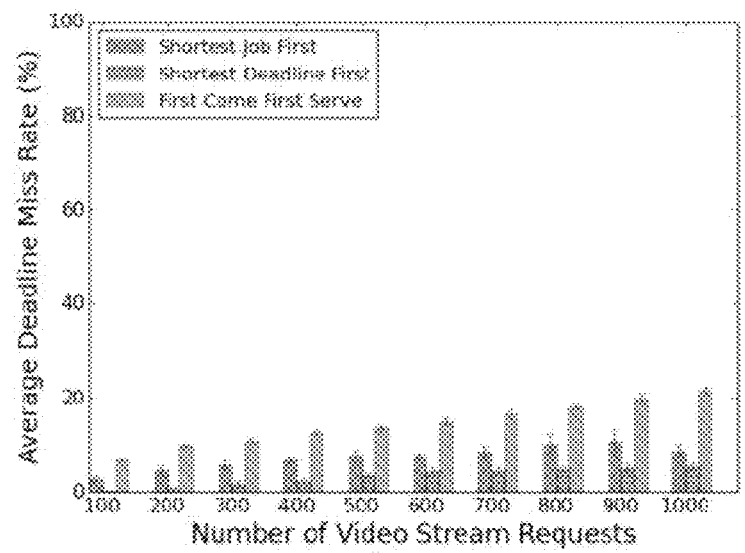
FIG. 6(e) shows a comparison of the average deadline miss rate of different queuing policies on the QoS-aware scheduling method when combined with dynamic provisioning policies.

As shown in FIGS. 6(d) and 6(e), SDF produces the lowest deadline miss rate in the dynamic provisioning policy. This is because SDF maps the most urgent GOP tasks first. Therefore, the rest of GOPs will have enough slack time and allow the GOP tasks in the startup queue to execute without missing their own deadlines. The reason that SJF has low startup delay but higher deadline miss rate is that it priorities GOPs the GOPs with short transcoding time from middle or rear part of the video stream. This creates an opportunity for the GOPs in the startup queue, while incurs a large deadline miss rate for long GOPs with short deadlines. In the FCFS policy, GOPs in the batch queue have to wait until all GOPs arrived earlier be transcoded, this leads to a high deadline miss rate.

Figure 6F:
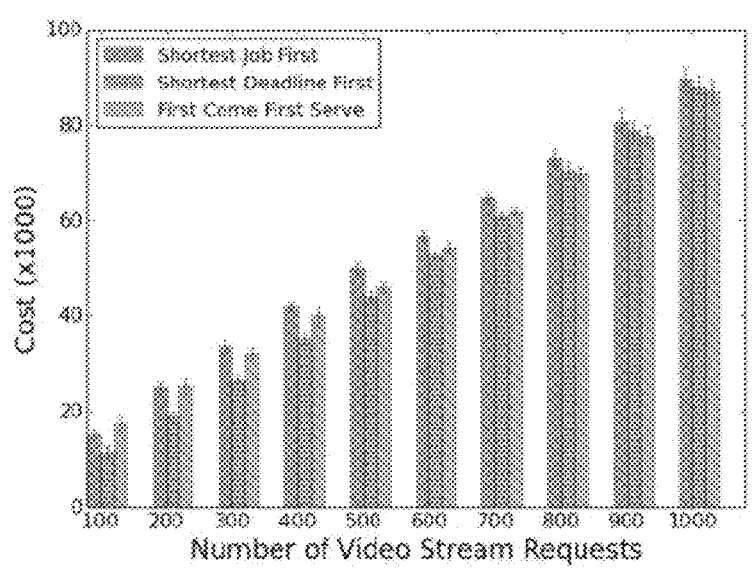
FIG. 6(f) shows a comparison of the incurred cost when using QoS-aware scheduling method versus a non-QoS-aware scheduling when combined with dynamic provisioning policies.

As demonstrated in FIG. 6(f), SDF incurs the lowest cost, especially when the video requests arrival is low and the system is not congested. As the number video requests increases and the system becomes congested, the cost of all three queuing policies increases and becomes similar.

From FIGS. 6(a) to 6(f), it can be concluded that, with the static resource provisioning policy, SJF provides the lowest startup delay and deadline miss rate while the incurred cost is similar to other two policies. However, in the dynamic resources provisioning, SDF provides better startup delay, deadline miss rate, and also a lower cost compared with the other two queuing policies.

Dynamic versus Static Resource Provisioning Policy: To further investigate the behavior of the dynamic resource provisioning policy, the QoS violation and the incurred cost are compared for both static and dynamic policies. As SJF and SDF perform the best in static and dynamic provisioning policies, we just compare the results from these two policies. For static policy, we only present the results for fixed number of VMs—from 5 to 10—because the startup delay and deadline miss rate are very high when few VMs are allocated.

Figure 7A:
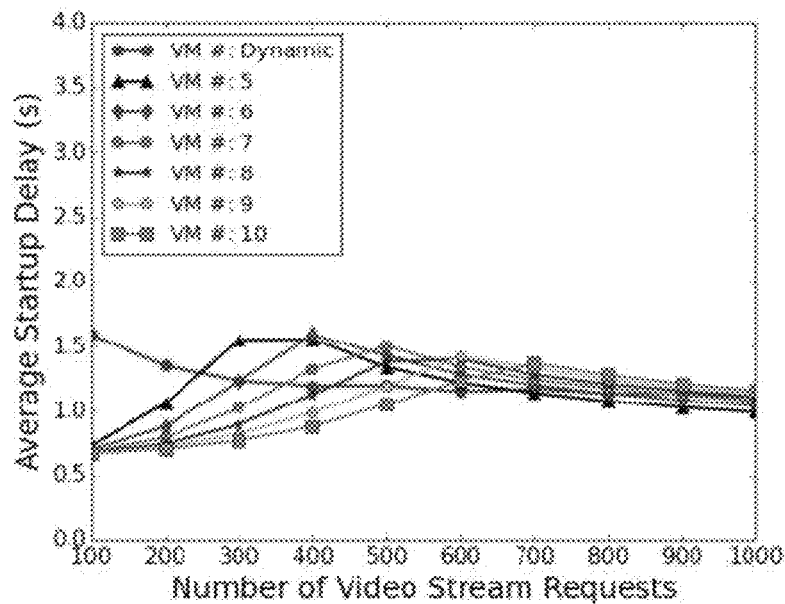
FIG. 7(a) provides a comparison of the average start up delay in dynamic and static provisioning policies.

In FIG. 7(a), as the number of video requests increases, the average startup delay in all static policies grows while in the dynamic policy it produces a low and stable startup delay. When the workload is not intensive (i.e., system is lightly loaded), the dynamic policy has a little bit higher startup delay ($\simeq$ 1 second) than the static policy. In fact, to reduce the incurred cost, the dynamic policy usually allocated fewer VMs in compare with the static one. Therefore, new GOP tasks have to wait in the queue to be transcoded. However, the static policy with a large number of VMs can process GOPs in the startup queue quickly that reduces the startup delay.

Figure 7B:
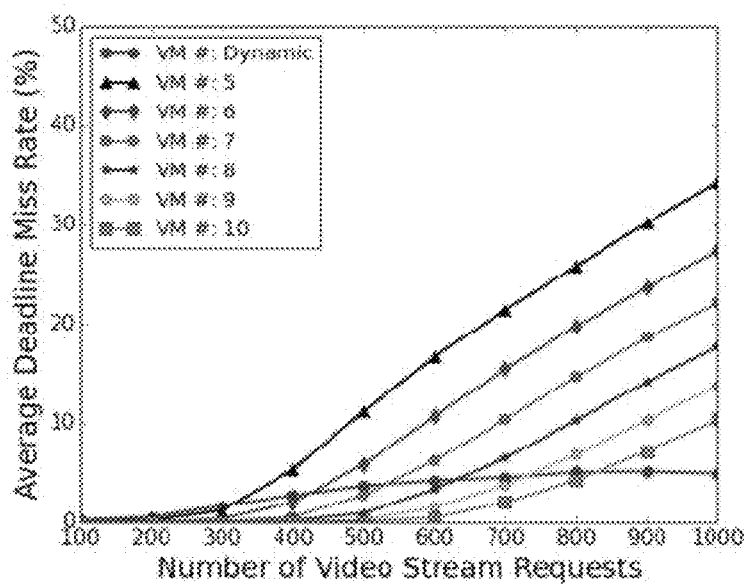
FIG. 7(b) provides a comparison of the average deadline miss rate in dynamic and static provisioning policies.

FIG. 7(b) illustrates that the dynamic resource provisioning policy leads to low and stable deadline miss rate in compare with the static one. In the static policy with few VMs, as the number of video requests increases, the deadline miss rate grows dramatically. As the dynamic provisioning policy functions based on the deadline miss rate to resize the VM cluster, it keeps the average deadline miss rate low, even when the system is congested.

Figure 7C:
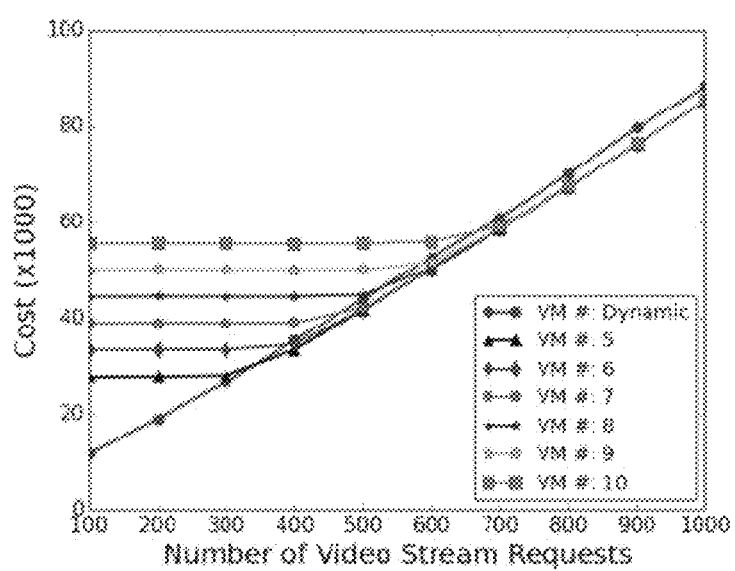
FIG. 7(c) provides a comparison of the incurred cost to the streaming provider in dynamic and static provisioning policies.

With low and stable startup delay and deadline miss rate, FIG. 7(c) shows that the dynamic provisioning policy reduces up to 70% cost when the system is not congested. When the video demand rate is low, VMs are under-utilized in the static policy; however, the stream provider still has to pay for them. In the dynamic provisioning policy, the system deallocates idle VMs when the deadline miss rate is below the lower bound threshold ($\alpha$), which reduces the incurred cost significantly. As the video demands rate becomes intensive, more VMs are created; therefore, the cost incurred by the dynamic policy approaches the static one.

Figures 8A, 8B, 8C:
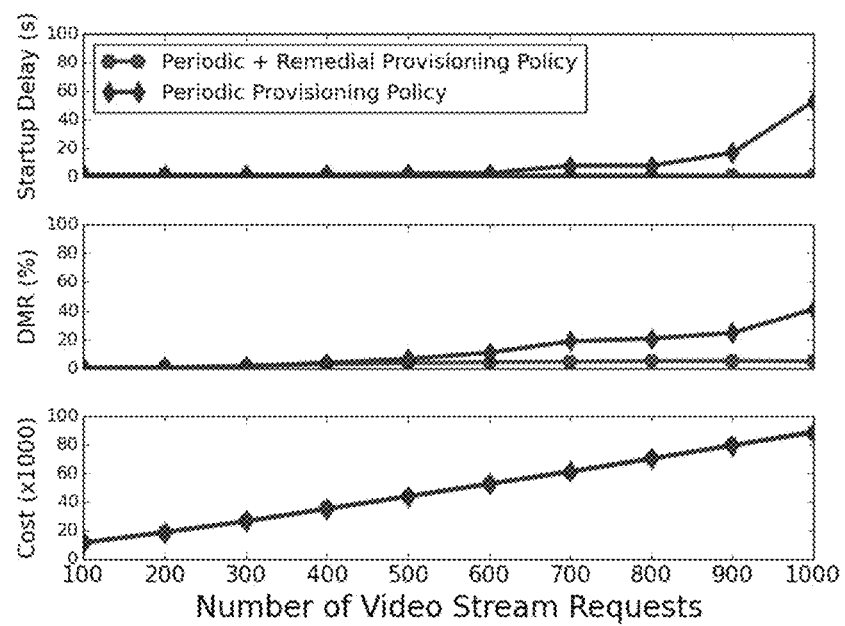
FIG. 8(a) provides a comparison of the startup delay when using a remedial provisioning policy versus a periodic provisioning policy.
FIG. 8(b) provides a comparison of the Deadline Miss Rate (DMR) when using a remedial provisioning policy versus a periodic provisioning policy.
FIG. 8(c) provides a comparison of the cost when using a remedial provisioning policy versus a periodic provisioning policy.

Impact of Remedial Resource Provisioning Policy: To evaluate the efficacy of the remedial provisioning policy, experiments were conducted on the dynamic resource provisioning policy in two scenarios: when the dynamic provisioning uses the remedial approach against the case that only the periodic provisioning policy is in place. As illustrated in FIG. 8, when the system is not congested, the difference between the two scenarios is negligible. This is because when few videos arrive during the next provisioning event, it does not significantly impact the accuracy of deadline miss rate estimation. In this case, the VMs allocated by periodic resource provisioning policy are capable to keep streaming QoS violation low and stable.

Alternatively, when the video demand rate is high, the inaccuracy in the estimated deadline miss rate becomes remarkable. Under this circumstance, as depicted in FIG. 8, relying only on the periodic provisioning policy leads to a high QoS violation rate. Nonetheless, when the remedial resource provisioning policy is utilized and the system is congested, we notice a remarkable difference in the QoS violation rate. It is shown in the last subfigure of FIG. 8 that injecting remedial resource provisioning policy comes without incurring any extra cost to the stream provider.

Pareto Analysis for the Cost and QoS Trade-off: The challenge in dynamic provisioning policy is how to handle the trade-off between the cost and the QoS violation, with different values of the upper bound threshold (i.e., $\beta$). In this experiment, we utilize the idea of Pareto front analysis to understand the relation between these factors and find the optimal range for $\beta$.

Figure 9:
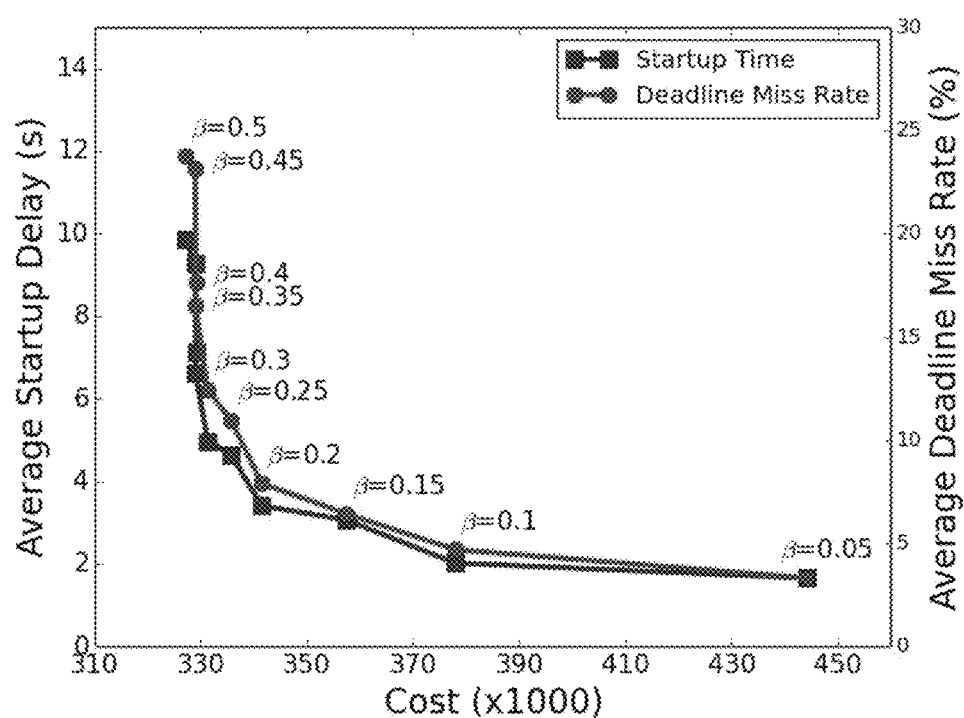
FIG. 9 depicts an illustration of the Pareto front for determining the upper bound threshold ($\beta$) in the dynamic provisioning policy. When $\beta=0.05$, it produces the lowest startup delay and deadline miss rate at the highest cost. In contrast, when $\beta=0.5$, it produces the highest startup delay and deadline miss rate at the lowest cost. There are values of $\beta$ (e.g., between 0.15 to 0.3) that provide low QoS violations with less incurred costs.

FIG. 9 shows the Pareto optimal front based on different values of $\beta$ that the CVSS users (i.e., stream provider) can choose. As we can see, the lower $\beta$ value produces lower startup delay and deadline miss rate, but also incurs higher cost. In the contrary, higher $\beta$ value reduces the expense at the cost of higher QoS violation. However, at some points, we can find some $\beta$ values (e.g., 0.15 to 0.3) that produce good video streams QoS with reasonably low cost. We noticed that the relationship between the cost and QoS violation in our system is not linear. That is, there are some optimal solutions, where a stream provider can spend a relatively low cost but gain a fairly low QoS violation too.

The described features, advantages, and characteristics may be combined in any suitable manner in one or more embodiments. One skilled in the relevant art will recognize that the various components of this design may be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the embodiment is included in at least one embodiment. Thus the appearance of the phrase "in one embodiment", "in an embodiment", and similar language throughout this specification may, but do not necessarily, all refer to the same embodiment.

The invention may be embodied in other specific forms without departing from the spirit or essential characteristics thereof. The present embodiments are therefore considered in all respects as illustrative and not restrictive. Accordingly, the scope of the invention is established by the appended claims rather than the foregoing description. All changes which come within the meaning and range of equivalency of the claims are therefore intended to be embraced therein.

The recitation of method steps does not denote a particular sequence for execution of those steps. Such steps may be performed in a sequence other than recited unless the particular claim expressly states otherwise.

The invention claimed is:

1. A system for performing on-demand cloud-based transcoding of video streams comprising:
   (a) a video splitter;
   (b) a transcoding task scheduler;
   (c) at least one transcoding virtual machine;
   (d) an elasticity manager;
   (e) a video merger;
   (f) a video repository; and
   (g) a caching policy;
   wherein the at least one transcoding virtual machine comprises a local queue;
   wherein said elasticity manager comprises at least one dynamic resource provisioning policies;
   wherein the video splitter comprises at least one video stream that is split into segments with at least one Group of Pictures that can be individually transcoded;
   wherein the segments are transcoded with one said Group of Pictures;
   wherein the transcoding task scheduler does not comprise prior knowledge of an arrival pattern of Groups of Pictures to the system; and
   wherein the dynamic resource provisioning policies comprise functionality to predict a deadline miss rate that will occur at a subsequent provisioning event.

2. The system of claim 1, wherein each said Group of Pictures comprises a task comprising an individual deadline.

3. The system of claim 2, wherein each said Group of Pictures comprises a first frame, and the deadline of the pertinent said Group of Pictures is the presentation time of the first frame of that said Group of Pictures.

4. The system of claim 1, wherein the transcoding task scheduler comprises a scheduling queue, wherein the scheduling queue comprises said Group of Pictures of at least one video stream.

5. The system of claim 1, wherein the transcoding virtual machines are allocated from a cloud provider.

6. The system of claim 1, wherein the transcoding virtual machines are homogenous.

7. The system of claim 1, wherein the local queue comprises data for said Group of Pictures.

8. The system of claim 7, wherein said Group of Pictures tasks in the local queue are scheduled in a first come, first served manner.

9. The system of claim 1, wherein the dynamic resource provisioning policies comprise functionality to notify the transcoding scheduler of changes in the transcoding scheduler's mapping decisions.

10. The system of claim 2, wherein a stream provider can set the percentage of transcoding tasks that can miss their deadlines.

* * * * *